United States Patent Office 3,308,462
Patented Mar. 7, 1967

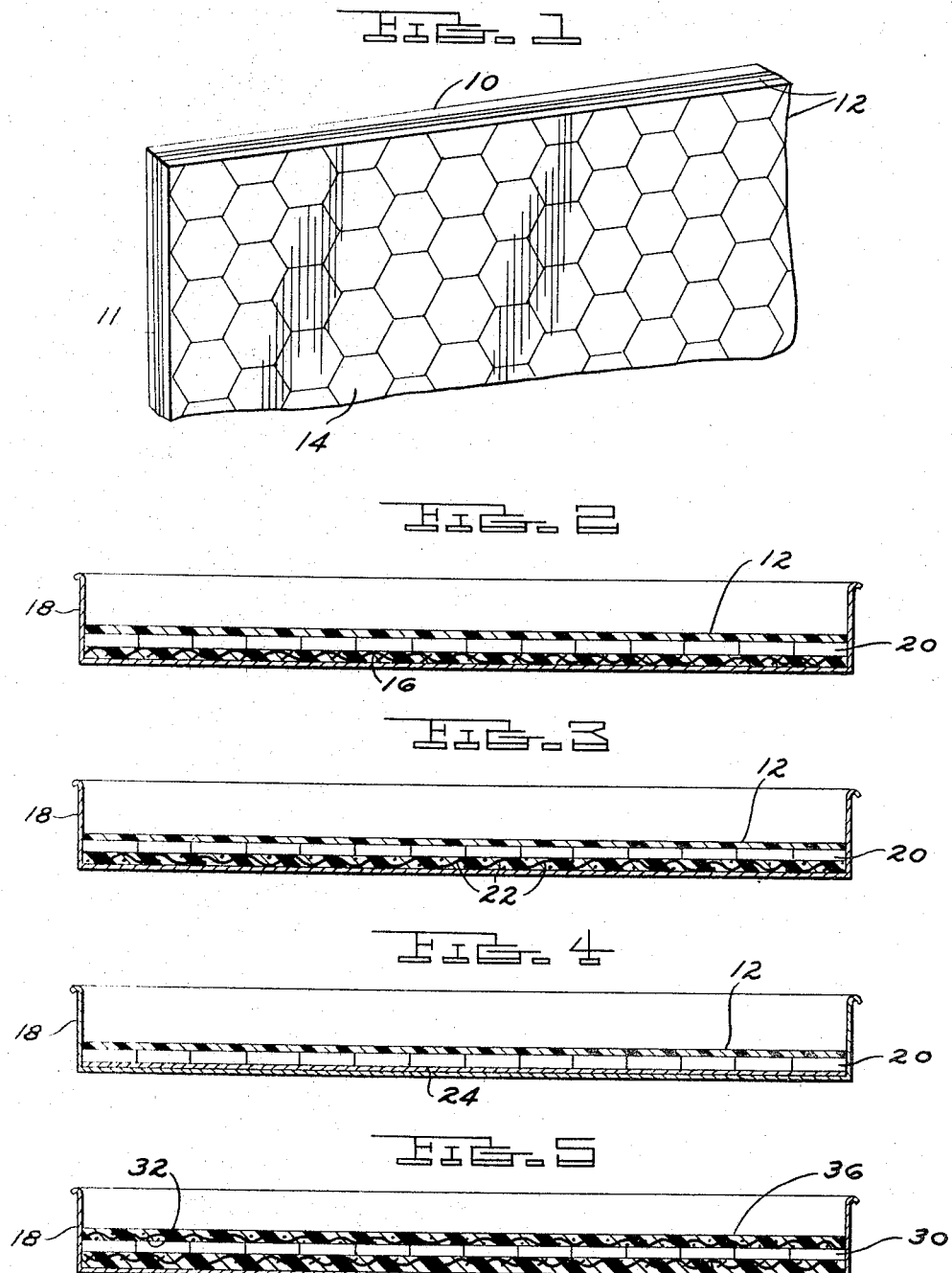

3,308,462
MAGNETIC LAMINATE
Jeremy V. Gluck, Ann Arbor, Mich., assignor to Conductron Corporation, Ann Arbor, Mich., a corporation of Delaware
Filed Oct. 2, 1962, Ser. No. 227,908
10 Claims. (Cl. 343—18)

This invention relates to a magnetic laminate and more particularly to modular assemblies for ferrite materials having magnetic properties.

The use of the magnetic properties of ferrites formed of powdered materials has been suggested particularly in connection with a conductive background such as a sheet of conductive material. Frequently, best results are obtained by utilizing a single sheet of conductive material which covers a fairly large area and a plurality of polygonal blocks of ferrite material sometimes referred to as tiles. These blocks are fitted with nesting edges on the conductive material and the assembly is used, for example, for absorbing radiation.

It is an object of the present invention to provide a composite assembly of ferrite and conductive material which has advantages in providing a protective medium for the ferrite which is sometimes fragile and frangible and also to permit ease of storing and application of the combined assembly in situations where exact planar positioning is not contemplated.

In previous usage, ferrite tiles have been bonded directly to metallic or plastic composite, primary or supporting substrates. The utility of such a construction depends greatly on the adhesive and is subject to destruction if the ambient temperature and vibration level is above that which adhesive can take. Other problems of compatibility of thermal expansion between the tiles and the primary substrate, and the nature and shape of the substrate have been faced where a large range of ambient temperature had to be met. The thermal expansion compatibility is especially important since this governs the ability of the tiles to withstand cracking during heating and cooling cycles either before or after the bonding is completed. In addition, the ferrites, as indicated above, which are used for some particular magnetic or electrical properties may be quite porous or crumbly and thus susceptible to erosion, shock or impingement damage.

It is an object of the present invention to provide an assembly of tiles in a suitable binder to form modules which in turn can be attached to a primary substrate.

Other objects and features of the invention will be apparent in the following description and claims.

Drawings accompany the disclosure and the various views thereof may be briefly described as:

FIGURE 1, a perspective view of a sheet of modular construction showing the manner in which tiles are embedded in relation to a substrate.

FIGURE 2, a sectional view illustrating the manner in which a sheet of cloth formed of fibers such, for example, as glass fibers, is used as a backing for an arrangement of tiles to be impregnated and enveloped in a coating.

FIGURE 3, a modified construction showing the use of a conductive metallic screen with a layer of foils and embedding material.

FIGURE 4, an illustration of the manner in which a metal foil can be used as a secondary substrate for a layer of tiles.

FIGURE 5, a sandwich construction utilizing a conductive sheet on one side and a fibrous reinforcement on the other side.

The article and method to be described herein involves the incorporation of an assembly of ferrite tiles in a suitable binder to form modules which can in turn be attached to a supporting substrate. In some cases where tile protection is not essential, an assembly of ferrites can be bonded to an intermediate substrate which is then bonded to the primary substrate, and in still other cases, the substrate to which the tiles are attached can be formed with an inherent load-bearing mechanical strength so that the entire assembly can be shaped as desired and used as as tructural element and as well function with the proper electrical and magnetic characteristics.

If the binder is to be a flexible or formable plastic, the advantages of a module formed in this way and of these materials are as follows:

(1) The tiles are protected by their embedment from erosion or mechanical damage;

(2) The thermal expansion mismatch between tile and primary substrates can be accommodated;

(3) The tiles are trapped in an embedding sheath and thus protected from vibration and acoustic shock damage;

(4) The attachment of large numbers of tiles to large areas is greatly facilitated;

(5) The modules can be attached to curved surfaces or articles of complex shape with relative ease;

(6) A conductive backing can be readily incorporated between the tiles and the substrate by nesting the tiles on a foil or a wire mesh before sealing the assembly with the binder. This permits the use of an inherently non-conductive primary or supporting substrate.

In FIGURE 1, an example of a composite unit, as above described, is shown wherein a supporting substrate 10 has adhering thereto a secondary substrate 11 and a plastic embedding layer 12, the layer enveloping and embedding and confining a plurality of tiles 14 which are disposed in edge-to-edge relationship in the layer of plastic.

An example of a method of producing a module sheet as above described is as follows:

(1) Where a non-conductive background is required, a fibrous sheet can be used such as shown in FIGURE 2 and a cloth of glass fibers, for example, or a mat 16 of such fibers can be placed in the bottom of a shallow pan 18. The tiles 20 are placed in the desired array on such surface. If conductivity is desired, a copper, aluminum or silver metallic screen 22 as shown in FIGURE 3 can be used. Thus, the secondary substrate is preferably a reticulated sheet of fibrous or metallic strands.

(2) Reference has been made to the shallow pan 18. The backing sheet and assembly of tiles is preferably laid out in the shallow pan 18 as shown in the drawings. A pan 10″ x 16″ about 1½″ deep, preferably lined with Saran Wrap to facilitate stripping, provides a convenient module.

(3) A quantity of uncured liquid plastic or resin binder is then poured into the pan until the tiles are covered. This material is of sufficiently fluid consistency that it can penetrate the fibers of the cloth backing or the screen backing and, alternatively, it may be preferable to deposit a quantity of this liquid in the pan before lowering the sheet and assembly into the pan. To insure complete covering of the backing material, it can be treated, as may be the tiles, with a special wetting liquid specific to the plastic to be used, and lowered into the pan containing liquid before the tiles are laid on. The amount of plastic used will determine the thickness of the material overlying the tiles. A substantially continuous coating over the tiles is desired to insure against rupture when it is shaped. A coating of ⅛₆ to ⅜₆″ will suffice to allow movement and provide good protection for the tiles.

A typical binder which can be used is silicone resin of the "potting" type, such as Sylgard 182 made by Dow Corning Corporation. The binder can be selected on the basis of viscosity to flow into the mesh and to fill the spaces between the tiles and it may also be selected on the basis of dielectric properties. In some cases where particularly good conductivity is required, the adhesive can be loaded with metallic particles such as silver, copper or aluminum with a suitable wetting agent on the particles to insure proper mixing and flow. Reference is made to U.S. patent to Marco Wismer et al. No. 2,999,834, dated September 12, 1961, wherein materials are shown for providing an effective coating on fibrous material, this material being of the type which can be cured to a solid resionus state usually by the application of heat.

(4) Depending on the type of embedding material that is used, the assembly is then subjected to an appropriate curing process. The cured conditions depend both on the requirements for curing the particular binder and also the need for removal of entrapped or entrained air both from the tile interstices and from within the tiles since very often the tiles are porous in themselves. To avoid surface eruptions and insure a closed sheet it is convenient to allow the resin to cure at room temperature for several days before applying heat. A shake table can also be used to drive off the bubbles. In a curing process involving the use of heat, this air is driven off and it causes surface eruptions if the curing proceeds too fast. For a silicone resin and in the case of particularly dense tiles, the curing time might require about one hour at 250° F. for the silicone above referred to. A faster curing can be accomplished under a vacuum together with the use of heat.

With a hardening plastic, it may be necessary to divide the curing into two steps, the first step involving curing to the point that the sheet can be handled, and the second step embodying forming the sheet to the particular shape which it is to have in its final assembly and then completing the curing action.

(5) The cured assembly can then be bonded to the supporting substrate with a suitable adhesive. For a silicone resin a pressure senstive silicone adhesive is used such as Dow Corning No. 271 adhesive. For other materials, an epoxy resin may be suitable. The choice of adhesive and binder is dependent on the anticipated exposure conditions of the sheet. It is important, of course, that the adhesive have a wetting characteristic both with respect to the cured binder and the supporting substrate. It is pointed out above also that the sheet may be cured to a final shape, as, for example, a tube, a sheet, or a beam, having a mechanical strength which requires no primary substrate. In all cases where the material is to be shaped in the ultimate use, it is essential that the tiles be properly spaced to permit this shaping.

An alternative construction and method is available where protection of the outer surface of the tiles is not desirable or necessary but a conductive backing is required or adaptability to a complex shape is a requisite. In this instance, a conductive backing 24 (FIGURE 4) can be provided of metallic foil, such as copper, aluminum, or silver which can serve as a secondary substrate, the tiles 20 being attached by a pressure sensitive adhesive or a curable resin such as an epoxy resin. In the event a metallic backing is not required, again a cloth fabric or mat may be made of glass fibers or a similar material. Also, where conductivity is important, the adhesive may be loaded with metallic particles, such as silver, copper or aluminum.

An appropriate adhesive may be of a pressure sensitive type or a curable epoxy resin, for example, having flexibility when cured. Again, appropriate spacing of the tiles is important particularly where the primary substrate is to be applied to a concavity. After the forming of the module of the secondary substrate and the ferrite tiles, there may be a bonding to a primary substrate again with either pressure sensitive adhesive or a curable adhesive.

The particular composition for the ferrite tiles which are used with the above assemblies is dependent on the particular magnetic and electrical characteristics desired. These tiles are usually formed from a powdered material which is mixed and baked or sintered to form a ceramic type of sintered tile having a dimension of about 3/16 to 5/16" thickness and a flat-to-flat dimension of about 5/8 to 1". The hexagonal type of tile illustrated in FIGURE 1 is a preferable shape although other shapes can be used which will nest together to form a relatively solid surface.

Another form of the invention shown in FIGURE 5 may involve the sandwiching of tiles 30 between two sheets of material. For example, a sheet of reticulated metal screen 32 may overlie the tiles on one side to provide a conductive backing, and a sheet of fibrous material 34, glass wool or cloth or the like, could overlie the tiles on the opposite side, the entire mass being impregnated with a setting plastic 36 of the types above suggested, silicone, or a resin such as Dow Corning Resin #2106 or an unsaturated polyester resin (formed by the reaction of a dicarboxylic acid with a dihydric alcohol, one or other or both of which contains one or more carbon-to-carbon double bonds, and the resulting polyester mixed with a vinyl compound such as styrene for purpose of forming cross-linkages, and accompanied if desired by polyurethane or epoxy resins as copolymers) which is internally plasticized or in which a plasticizer is blended.

By way of example, a suitable internally plasticized resin comprises 60% polyester-40% polyurethane copolymer, and to this mixture 0.1% to 1.5% of di-methyl para toluidine is added, the percentages being by weight. A successful laminate has been formed with a metallic screen and ferrite tile encased between three layers of Volan glass, on each side, impregnated and cured with Micropreg #1 resin.

The above described article provides an extremely convenient way of protecting the multiple tile modules, and when it is possible to utilize the embedding plastic as a structural element shaped as a sheet, cylinder, or I-beam, for example, the tiles can then form a reinforcing part of the module and the assembly inserted in place to perform its function. The article formed is readily applied to the usual primary substrate and improves the resistance to temperature variations and other shock conditions to which it may be subjected.

What is claimed is:

1. A laminate article of manufacture to facilitate the use of the radiation absorbing properties of ferrite tiles which comprises:
   (a) a reticulated sheet of flexible backing material,
   (b) a layer of closely arrayed ferrite tiles on said backing material formed of a sintered mixture of powdered material shaped in flat polygons, and
   (c) an embedding plastic material impregnated into said reticulated sheet and enveloping and surrounding said tiles, said plastic material being cured to a flexible stable condition.

2. An article as defined in claim 1 in which the embedding material comprises a silicone resin of the potting type.

3. An article as defined in claim 1 in which the reticulated sheet comprises a screen of metallic strands.

4. A laminate article of manufacture to facilitate the use of the radiation absorbing properties of ferrite tiles which comprises:
   (a) a backing sheet of porous material,
   (b) a layer of closely arrayed ferrite tiles in edge-to-edge relation on said backing material formed of a sintered mixture of powdered material shaped in flat square edged polygons, and
   (c) an embedding material impregnated into said porous sheet and enveloping and surrounding said tiles, said material being cured to permit application of said laminate article to non-planar shapes.

5. An article as defined in claim 4 in which the porous backing material comprises a reticulated sheet of electrically conductive material.

6. An article as defined in claim 4 in which said embedding material comprises a setting plastic material which can be flowed into said backing material and around said tiles prior to setting to form a complete enclosure for said tiles.

7. An article as defined in claim 4 in which said embedding material comprises a plastic material which when set has a flexible characteristic to permit the laminate to be shaped in use to non-planar conditions.

8. An article as defined in claim 4 in which said porous material comprises a non-conductive sheet of material on one side of said tiles, and a second sheet overlying said tiles on the other side of said porous sheet, said second sheet being of electrically conductive material, said embedding material being impregnated into both of said sheets.

9. A laminate article of manufacture to facilitate the use of the radiation absorbing properties of ferrite tiles which comprises:
 (a) a supporting substrate having a mechanical strength,
 (b) a sheet of flexible conductive material,
 (c) a plurality of closely arrayed ferrite tiles in edge-to-edge relation on said sheet formed of a sintered mixture of powdered material, and
 (d) means binding said tiles to said sheet comprising an adhesive having a flexibility which will permit relative expansion between said sheet and said tiles without destruction of said adhesive, and
 (e) means adhering said sheet to said supporting substrate.

10. A laminate article of manufacture to facilitate the use of the radiation absorbing properties of ferrite tiles which comprises:
 (a) a sheet of flexible backing material having a surface adapted to be intimately bonded with an embedding material,
 (b) a layer of closely arrayed ferrite tiles on said backing material formed of a sintered mixture of powdered material shaped in flat polygons, and
 (c) an embedding plastic material intimately bonded with said surface of said sheet and enveloping and surrounding said tiles, said plastic material being preferably cured to a flexible stable condition.

References Cited by the Examiner
UNITED STATES PATENTS

| | | | |
|---|---|---|---|
| 2,413,610 | 2/1946 | Donelson | 317—2 |
| 2,851,639 | 9/1958 | Ford et al. | 317—2 |
| 3,121,825 | 2/1964 | Abegg et al. | 317—2 |

RODNEY D. BENNETT, *Acting Primary Examiner.*

ALEXANDER WYMAN, *Examiner.*

R. A. FLORES, B. L. RIBANDO, *Assistant Examiners.*